Sept. 1, 1953  A. P. GAUVREAU  2,650,970
ARCLESS CONTROLLING SWITCH
Filed Feb. 18, 1950  2 Sheets-Sheet 1

INVENTOR.
ALPHONSE P. GAUVREAU
BY
Hyde, Meyer, Baldwin & Doran
ATTORNEYS

Sept. 1, 1953   A. P. GAUVREAU   2,650,970
ARCLESS CONTROLLING SWITCH
Filed Feb. 18, 1950   2 Sheets-Sheet 2
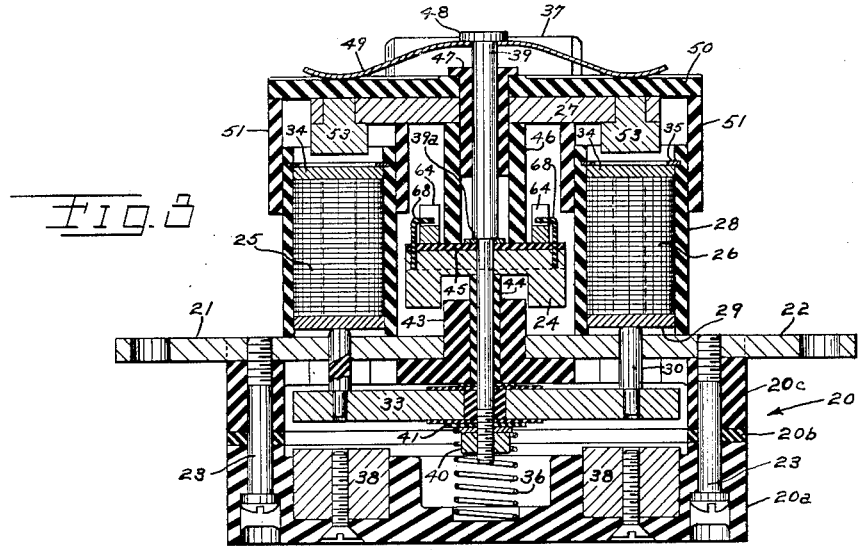
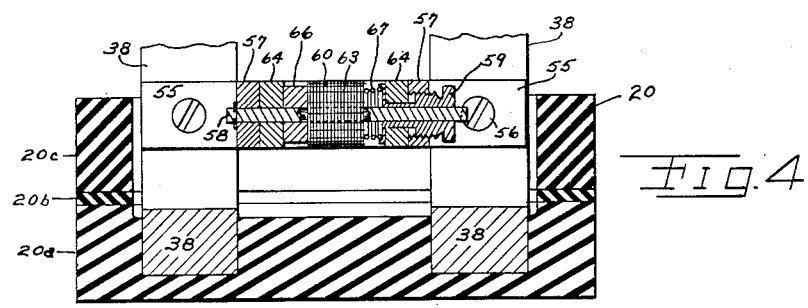
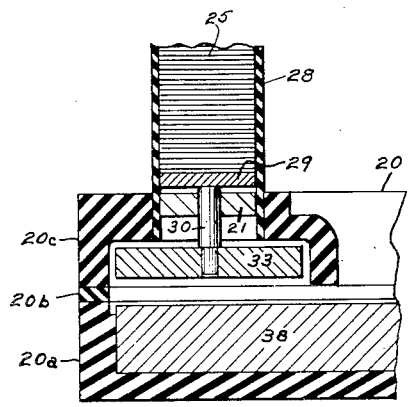
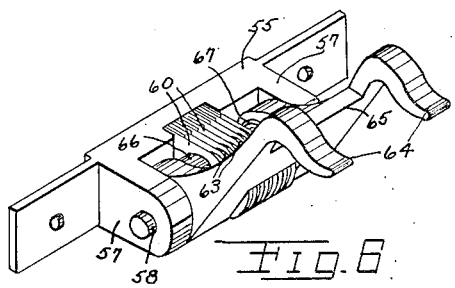
INVENTOR.
ALPHONSE P. GAUVREAU
BY
Hyde, Meyer, Baldwin & Doran
ATTORNEYS

Patented Sept. 1, 1953

2,650,970

UNITED STATES PATENT OFFICE

2,650,970

ARCLESS CONTROLLING SWITCH

Alphonse P. Gauvreau, Cleveland Heights, Ohio, assignor to The Clark Controller Company, Cleveland, Ohio, a corporation of Ohio Application February 18, 1950, Serial No. 144,951

8 Claims. (Cl. 200—146)

This invention relates to that class of electrical switches classed as contactors and breakers, and more particularly to what can be described as controllers of the above named types which will prevent the occurrence of unwanted or harmful electrical disturbances upon switch operation. The present invention is an improvement over the devices shown and claimed in my copending application U. S. Serial No. 111,528 filed August 20, 1949, for Arc Preventing Switch.

Closing of a circuit containing such load elements as motors ordinarily produces heavy current surges which in many cases, if not limited, will burn out the motor or other component. In structures heretofore known, special devices are utilized to perform this circuit closing operation and are typified by the usual cumbersome motor starter, complex motor controller, or other means to allow the current to increase only gradually under the very high mechanical or thermal time constants of such loads.

Opening of a circuit carrying heavy current, especially when that current is utilized in some circuit component to create a magnetic field, causes the opening contacts to become electrodes between which is produced an arc into which is dissipated the stored energy of the magnetic field. Since collapse of the magnetic field generates high voltages across the contacts, it tends to support the flow of current across the gap and maintain the arc. When the circuit is opened suddenly and completely, enormous electrical potential is developed, requiring the use of expensive and bulky means to prevent rupture in system components and safeguard against danger to personnel. Further, in certain situations, such as in aviation, considerations of weight prohibit the use of such expedients.

The present invention aims to satisfy the foregoing and other conditions by associating with the main switch contacts a shunt path capable of carrying substantially full load without danger, but which path includes a variable resistance together with novel and improved means for effecting the variation of the resistance, and means for retarding variation of the resistance over a period of time sufficient to enable the magnetic field to slowly dissipate its energy without troublesome effects and/or to allow for the gradual application of voltage to, say, a motor load during the acceleration time of the motor.

In my aforesaid copending application I have disclosed arc preventing switch mechanisms comprising two pairs of cooperating relatively movable contact members connected in parallel, with the members of one pair in one branch of a circuit and the members of the other pair in the other branch of the circuit, the members of one pair being made of relatively low resistance material and the members of the other pair including a portion made of normally high resistance material but variable to low resistance by compression thereof. I have provided, in conjunction therewith (as disclosed in the aforesaid copending application) means for supporting and operating said members in such manner that upon switch opening movement the members of the low resistance pair separate first, the current thereafter proceeding through the variable resistance pair while its resistance is increasing by decompression, so that when the current through the said variable resistance pair is eventually broken, the resistance in the circuit has become so high that sparking is substantially or entirely prevented. Means to accomplish this action are provided by means of the elements of retarding mechanisms applied to the release stroke of the movable parts of the switch.

As hereinabove indicated an object of the present invention is to provide means for retarding the change of the said variable resistance for a period of time such that it will allow the resistance to control circuit current as dictated by the needs of the application when the switch is used both to make and break circuits. Retarding means of several types were disclosed in the aforesaid copending application. The retarding means now to be described herein is of novel and improved nature in its application to the switch hereof in that it is double acting and it may be pre-regulated in accordance with the time constant of the circuit so as to prevent the flowing of surge currents upon circuit closure or the generation of high transient voltages and arcs upon opening of the switch contacts.

A suitable material for the compounding of the variable resistance consists of carbon in the form of a pile of discs constituting members which are adapted to increase or decrease in electrical resistance respectively upon decompression or compression thereof. If such a pile is loosely supported, and the switch or its support is subject to vibration such as in aircraft installations, the pile components rattle around, some of the elements of the pile may be crumbled, fractured, or otherwise damaged so that the pile becomes ineffective, and the switch loses its ability to perform its prime function. A further object of the invention, therefor, is the provision of a novel and improved means for constantly maintaining the pile under compression in the switch-open condition.

Other objects and advantages will be apparent from a study of the following description of one embodiment of my invention, in conjunction with the accompanying drawings, wherein Fig. 1 is a top plan view of a switch mechanism embodying the invention;

Fig. 3 is a sectional view taken on the line 3—3 of Fig. 1;

Fig. 4 is a sectional view taken on the line 4—4 of Fig. 2;

Fig. 5 is a sectional view taken on the line 5—5 of Fig. 1; and

Fig. 6 is a perspective view of one of the elements of the invention.

Figure 1:
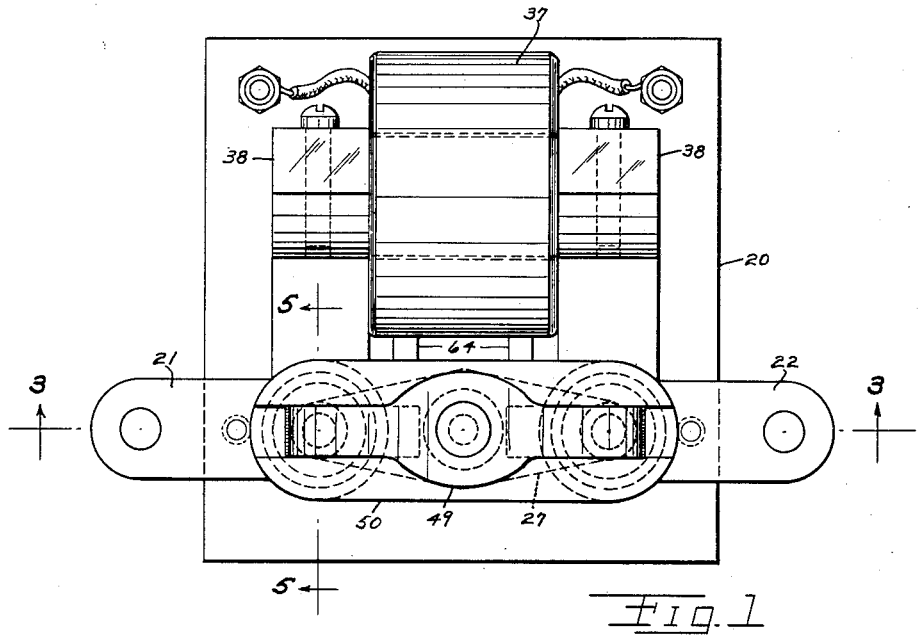

The switch mechanism now to be described includes a base 20 having three superposed portions 20a, 20b, and 20c respectively, all of insulating material, the division of the base into sections being mostly for convenience in the fabrication of a hollow, box-like structure which houses some of the operating elements, as will appear. Two terminal plates 21 and 22 are fixedly attached on top of the base by means of machine screws 23, said screws also serving in this manner to retain the base portions in fixed positional arrangement. Lead wires may be connected to the terminal plates and the purpose of the structure is to provide contact means to make or break the circuit between the plates, as desired, without giving rise to injurious effects. The terminals 21 and 22 are also supported at inner confronting end portions thereof, upon the flange of a thimble 43, connected to, or forming part of, the base portion 20c; and the thimble has a bore axially therethrough in which is reciprocably guided a sleeve 44 to be referred to.

I have provided two distinct branches or paths, in parallel, each one effective of itself to complete said circuit. Speaking first generally, one path is adapted to be completed through a contact bridge or plate 24 when said bridge is lowered into direct contact with terminals 21 and 22. Bridge 24 is made from some low electrical resistance material such as copper or similar metallic material. The other path is adapted to be completed through a pair of carbon piles 25 and 26 as a variable resistance by means of a conducting member 27 cooperating in series relationship with the said piles, this conducting member 27 being here termed, for convenience, a discharge bar or discharge plate. Ordinarily, the variable resistance or pile branch cannot be made low enough in resistance to serve in continuous use as the main current carrier since there would be too much heat generated in this branch. Hence it is necessary to parallel the pile branch with a main contact bridge member. The resistance of the variable resistance branch, however, may be made sufficiently low that the main contact branch can make or break without causing ionizing potentials to appear at any point in the circuit and/or without allowing any undue current surges.

In the present instance the piles are identical, each consisting of a superposed plurality of carbon discs or washers housed in an insulating tube 28 rigidly fastened to the base portion 20c. The piles rest respectively on lower conducting discs 29 which are supported by pins 30 of non-conducting material mounted on respective ends of an armature 33, and the pins extend through holes in the respective terminals 21—22. The upper end of each pile is topped off by a disc 34 of conducting material which, like disc 29 can be of metal. The upper disc has an upper limit back stop consisting of a split snap ring 35 which nests in an inner groove in the tube 28. The function of the snap ring could otherwise be performed by an interior shoulder integral with the tube. The armature 33 is urged upwardly, for example by the biasing effect of a spring 36 which is compressed between the armature and the bottom wall of base portion 20a, and the armature is stopped upwardly upon the thimble 43. It will be apparent therefore that the pins 30 may be of suitable length, as shown, to maintain a compressive pressure on the piles 25 and 26 so as to prevent vibration of the switch assembly from injuring the elements of the pile during switch-open condition.

Means for applying to the piles a variable pressure adequate to materially change their resistance characteristics will now be described. Said means includes an electromagnet 37 the core of which is supported on, and magnetically in flux-flow communication with, a pair of right-angled pole pieces 38 which extend downwardly into the base 20, and then laterally towards and under armature 33. Obviously, when the coil of magnet 37 is energized from an independent circuit (not shown) which is closed by operation of a starting switch (also not shown), the armature 33 descends (Fig. 3), pins 30 drop with it, releasing the piles and their associated discs 29 and 34 which float freely in the tubes 28. The attraction between the pole pieces and the armature is amply sufficient to overcome the bias of the spring 36. Both the shunt circuit and the main circuit continue to remain open momentarily, but they close in the order named by means to be now described.

A vertical pillar 39 is attached to armature 33 by means of a nut 40 which bears against insulating washers 41 on the lower side of armature 33 clamping it against the sleeve 44 which, in turn, abuts on the lower surface of the contact bridge 24. The contact bridge 24 is caught and compressed between the upper end of the sleeve 44 and a shoulder 39a of the pillar 39 by the action of the nut 40. Thereby, armature 33, sleeve 44, contact 24, and pillar 39 compose a single rigid unit guided reciprocatively in a vertical direction by the sleeve member 44 in the aforesaid bore of the thimble 43.

An insulating cap 45 is shown covering the top of bridge 24. Between cap 45 and discharge plate 27 is a spacer tube 46 of insulating material. A bushing 47 of insulating material guides the top of pillar 39 and insulates it from the discharge plate 27. A flange 48 on top of the pillar 39 bears against the middle of a leaf spring 49, the ends of which abut spaced zones on the upper surface of a box-like cover or hood 50. Depending walls 51, of the hood 50, are slidable on the tubular covers of the piles 25 and 26 and generally protect and shield the piles from atmosphere borne contaminants such as dust.

Discharge plate 27 has, near its opposite ends, depending and conducting portions 53 held in vertical alignment with the respective piles 25 and 26 by the walls 51 coacting with the tubes 28.

Assuming the parts to be in open circuit position as shown in Fig. 3, when it is desired to complete the circuit between terminals 21 and 22, magnet coil 37 is energized and armature 33 moves down towards pole pieces 38. Pins 30 move down with the armature and retract beyond the contact surfaces of the terminal bars 21 and 22, permitting discs 29 and 34 and the carbon piles to rest freely on the terminals 21—22 and without pressure thereon within the tubes 28. Upon continued downward movement of the armature, pillar 39, spring 49, and hood 50 exert downward pressure on the discharge plate 27, the members 53 then making contact with the top discs 34, thereby closing the shunt circuit through the carbon piles and the discharge plate. Upon initial closing, as described, the carbon discs lie loosely upon each other, urged only by gravity, and the resistance of the piles is extremely high so that, upon contact, the circuit is established without any immediate current surges.

As the armature continues to descend, the pile resistance decreases as greater and greater pressure is applied to the piles through action of the flange 48 stressing the spring 49. At about the time when the shunt circuit, as just described, is sufficiently compressed and substantially full current is flowing therein, the direct contact bridge 24, which descended with pillar 39, is allowed to contact the terminals 21 and 22 by the flexing of the spring 49; there being now no appreciable voltage drop between bridge 24 and the terminals due to the low resistance of the previously established shunt path.

The action just described is subject, over all, to an adjustable restraining force which acts to prevent any sudden motion of the movable parts of the switch. In this instance, retarding means function to prevent the occurrence of surges or the building up of current beyond any desired value. In the restraining means disclosed in my prior application, the stroke velocity retarding effect acts only upon switch release motion and varies with the amount of spring extension thereby producing circuit current variations dependent upon the relative positions of the spring suspension points. The same release stroke control was alternatively depicted in my copending application as obtainable using a non-linear retard which depended upon the relative positions of a tapered valve and port which governed flow of a fluid.

I have, however, found that change in rate of retardation of pile resistance variation is not indispensible to the prime functions of the switch. Except in certain special applications, a retarding means which varies linearly with displacement is ordinarily sufficient to provide suitable switch action. The advantage of such a linear device over the earlier non-linear device is primarily that of lower cost in manufacture.

I have now provided friction brake means for controlling switch contact movement in both directions, closing and opening. The retarding or restraining means may be of any kind suitable for the purpose and is herein proposed as any device wherein the braking effect is constant regardless of the relative position of its parts.

Figure 2:
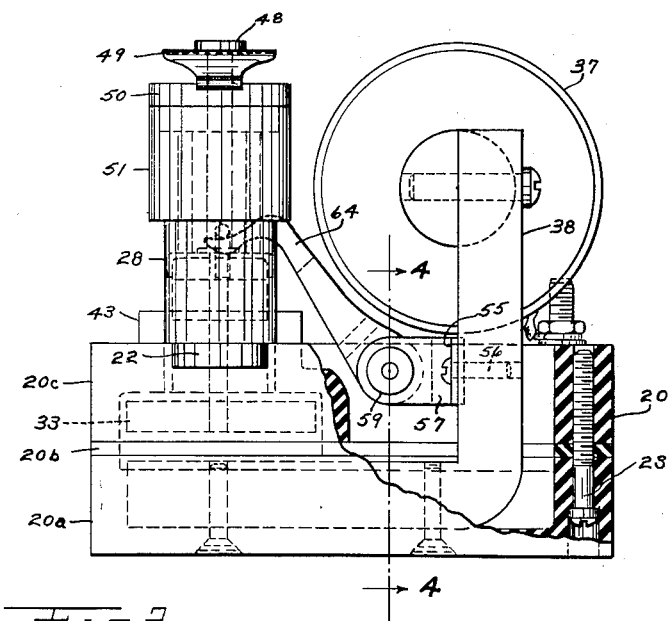
Fig. 2 is a side elevational view, with parts broken away and in section, as observable from the left of Fig. 1.

As best seen in Fig. 3, small hook-like protuberances 68 of non-conducting material extend from the surface of the main contact bridge 24 to engage fingers 64 of a retarding lever 65, see Fig. 6. Fixed to the retarding lever 65 are a set of parallel flexible plates 63 which are interleaved with a set of similar plates 60 fixed to the bracket 55. The bracket 55, of non-magnetic material, bridges the upright legs of the pole pieces 38 and is fixed thereto by screws 56, see Fig. 2. Two spaced lugs 57 on the bracket provide journals for a shaft 58. One such journal is in a screw plug 59, see Fig. 4, said plug, by endwise movement thereof, being adapted either to increase or decrease pressure between the sets of parallel plates 60 and 63. Also provided, on shaft 58, are a suitable spacer 66 and a spring 67. It will be obvious that by turning up or retracting plug 59 the frictional engagement between plates 60 and 63 may be respectively increased or decreased by change in the compression of spring 67 and may be predetermined, as desired, according to the time constants of the circuit with which the switch is used.

Circuit closure, then, is accomplished through the motion of the bar 27 and the main bridge 24 subject in time duration to the velocity restraint applied to the switch mechanism by the hooks 68 being caused to draw with them, on the closing stroke, the fingers of the retard lever 65 of the friction brake. Although the operation has taken a substantial time to describe, the total time for switch closure is actually of the order of a second, or fraction thereof, dependent upon whether the switch is used as a contactor or breaker, or both, and subject to its timing adjustment to suit the circuit constants. As a motor starter considerably longer times may be involved.

When the conditions call for an opening of the switch, magnet coil 37 is deenergized manually or automatically, and operation of the switch proceeds in reverse order. Spring 36 strips the armature 33 from the pole pieces 38, and bridge 24 breaks contact with terminals 21 and 22. No arcing occurs because the shunt circuit, still closed through the piles 25 and 26 and bar 27, has a resistance low enough that the IR drop due to flow of line current plus a very small transient voltage do not constitute sufficient pressure to exceed ionizing potential at the main contacts. Compression is reduced on the piles by continued upward movement of the pillar 39, relieving tension on the spring 49 in this operation. By the time pins 30 rise sufficiently to lift discs 29 from the terminals 21 and 22 and compress them and the piles against snap rings 35 or other abutment means at the upper ends of the tubes 28, the discharge bar contacts 53 have already decompressed the piles and been separated from the upper discs 34 by a suitable air gap denoting open circuit.

In preventing too sudden a decompression of the carbon piles, means is provided in the before described friction brake for retarding the upward motion of pillar 39. In the present discussion of actions occurring during the release stroke, under the impulse of spring 36 and spring 49, insulating cap 45 is urged against the fingers 64 of the retarding lever 65 which, because of the reversible action of the before described friction plate structure, resists upward motion of the armature and pillar assembly and thereby causes the release stroke to take place with reduced velocity. The time allowed for the stroke to take place, which action decompresses the piles, is adjustably sufficient to allow for the gradual dissipation of the stored magnetic energy of the circuit. This energy, of course, appears as low grade heat in the piles. In this manner any objectionable transient voltages which ordinarily would appear upon interruption of the circuit are eliminated and hence any effects of such transients disappear as well. At the time when the bar 27 is actually parting company from the upper pile discs 34, there exists an extremely high resistance through the piles. Hence, at this point in the operation, although the circuit is being opened, there is practically no current flowing therein. Therefor any electrical discharge that may occur between the bar 27 and the piles can have no damaging effect upon the elements of the device.

The structure just described will be found both useful and economical in rigorous adaptations, such as the control of rolling mill motors or heavy duty relays relating to traction equipment. Obviously the switch causes no radio noise, and allows no burning of contacts. It is especially useful in aircraft where the low ionizing potentials of high altitudes make the suppression of arcing an extremely difficult problem. If used as the main power switch in radio or television circuits it eliminates surges and electrical reactions which arise from the usual sudden application of voltage to cold filament and condenser loads. Therefore a longer life of the components of such circuits could reasonably be expected.

What I claim is:

1. Switch mechanism comprising two electric circuit terminals separated by a gap, and means for closing said gap by way of two parallel branches of a switch circuit, a first one of said branches including a relatively low resistance bridge member adapted, by contacting both said terminals, to close the gap, and to open the gap by breaking said contact, and the second branch including two piles of high resistance plates, the resistance of said piles being reducible by application of pressure thereon, one end of each pile being engageable with a respective terminal, and a relatively low resistance electrically conductive bar adapted to engage and span the other ends of said piles, means for movably supporting said bridge member and said bar to move them toward and from said terminals during respective switch closing and opening movements, means effecting closure of said second branch before said first branch during switch closing, and conversely effecting opening of said first branch before said second branch during switch opening, means for applying pressure on said piles through said bar during switch closing motion, and for relaxing said pressure during switch opening motion, and additional means for maintaining constraining force on said piles after said bar is moved out of compressive contact with said piles.

2. Switch mechanism as defined in claim 1 wherein the means for applying pressure to said piles includes an electro-magnet energizable to institute switch closure, an armature movable towards said electro-magnet upon energization thereof, and a compound element comprising said bar, said bridge member, and said armature, all mounted on a common member whereby switch closing is effected when said armature moves towards said magnet, and wherein the constraining means is carried by said compound element and abuttable against said piles when said armature moves in a switch opening direction.

3. Switch mechanism as defined in claim 2 wherein each said pile consists of a superposed stack of carbon discs contained within an insulating tube, one end of each said pile resting on its respective terminal when in switch closed position, back stop means for restricting movement of each said pile towards the other end of its said tube, there being lost motion spacing between said backstop and said pile, and wherein the means for applying constraining force on said piles is abuttable against the ends of said piles remote from said back stop when the switch is moving to open position.

4. Switch mechanism comprising two electric circuit terminals separated by a gap, and means for closing said gap by way of two parallel branches of a switch circuit, a first one of said branches including a relatively low resistance bridge member adapted, by contacting both said terminals, to close the gap, and to open the gap by breaking said contact, and the second branch including two piles of high resistance elements, the resistance of said piles being variable by changes of pressure thereon, one end of each pile being engageable with a respective terminal, and a relatively low resistance electrically conductive discharge bar adapted to engage and span the other ends of said piles, means for movably supporting said bridge member and said bar to move them together toward and from said terminals during respective switch closing and opening movements, means effecting closure of said second branch before said first branch during switch closing, and conversely effecting opening of said first branch before said second branch during switch opening, means for applying pressure on said piles through said bar during switch closing motion, and for relaxing said pressure during switch opening motion, means operatively effective upon said bridge member during switch movement thereof to retard said switch movement, said last named means being preadjustable to maintain a constant braking effect on said bridge member as it moves relative to said terminals.

5. Switch mechanism comprising two electric circuit terminals separated by a gap, and means for closing said gap by way of two parallel branches of a switch circuit, a first one of said branches including a relatively low resistance bridge member adapted, by contacting both said terminals to close the gap, and to open the gap by breaking said contact, and the second branch including two piles of high resistance plates, the resistance of said piles being reducible by application of pressure thereon, one end of each pile being engageable with a respective terminal and a relatively low resistance electrically conductive bar adapted to engage and span the other ends of said piles, means for movably supporting said bridge member and said bar to move them simultaneously toward and from said terminals during respective switch closing and opening movements, means effecting closure of said second branch before said first branch during switch closing, and conversely effecting opening of said first branch before said second branch during switch opening, means for applying pressure on said piles through said bar during switch closing motion, and for relaxing said pressure during switch opening motion, and additional means for maintaining constraining force on said piles when said bar is moved out of compressive contact with said piles, and means operatively effective upon said bridge member during switch movement thereof to retard said switch movement, said last named means being preadjustable to maintain a constant braking effect on said bridge member as it moves relative to said terminals.

6. Switch mechanism comprising two electric circuit terminals mounted on a base and separated by a gap, and means for closing said gap by way of two parallel branches of a switch circuit, a first one of said branches including a relatively low resistance bridge member adapted, by contacting both said terminals, to close said gap, and to open the gap by breaking such contact, and the second branch including two piles of high resistance elements, the resistance of said piles being variable by changes of pressure thereon, one end of each pile being engageable with a respective terminal, and a relatively low resistance electrically conductive bar adapted to engage and span the other ends of said piles, electromagnetic means energizable to move said switch to closed position including a magnet source, an armature biased away from said source but attracted to and movable towards said source during energization thereof, means for connecting said bar, said bridge member, and said armature together so that they move as a unit during respective switch closing and switch opening movement, means effecting preliminary closure contact of said bar with said piles before said bridge member contacts said terminals during switch closing movement, and for terminating contact between said bridge member and said terminals before said bar breaks contact with said piles during switch opening movement, whereby increasing pressure is exerted through said bar against said piles during switch closing movement, and said pressure is decreased and relieved during switch opening movement, each said pile consisting of a stack of superposed carbon discs supported by cylindrical insulating means, one end of each said stack resting on a respective terminal when in switch closed position, back stop means on each said supporting means for restricting movement of the stack towards the other end of its said supporting means, there being lost motion spacing between said back stop and the adjacent end of the stack, and constraining means for maintaining relatively light constraining force on said piles when said bar is moved out of compressive contact with said piles comprising projecting means carried by said connecting means and abuttable against the ends of said piles remote from said backstop means when said armature is moving towards its switch open position.

7. Switch mechanism as defined in claim 1 and wherein means is provided to retard switch movement, said retarding means comprising a member operatively engaging said bridge member and swingably mounted on said base, and friction brake means having a portion fixed with respect to the base and another portion fixed with respect to said member, and means for predetermining the frictional drag of said brake means.

8. Switch mechanism comprising two relatively low resistance terminals separated by a gap, and means for closing or opening said gap by way of two parallel branches of a switch circuit, one branch including a relatively low resistance bridge member adapted to open or close the gap and make or break contact with both terminals, and the second branch including two piles of high resistance plates which respectively at one end engage said terminals, and a relatively low resistance bar adapted to make or break contact with the opposite ends of said piles, means for movably supporting said bridge member and low resistance bar to move together toward and from said terminals during switch closing and opening movements, yielding means between said bridge member and resistance bar compelling closure of the second branch before the first during switch closing, and opening of the second branch after the first during switch opening, means for moving said bridge member and bar into and out of switch closing position and for applying and relieving pressure between the high resistance plates during such motion, and means for retarding change of such pressure during switch movement during a period of time sufficient to prevent surges and/or transient voltages from building up in an electric circuit, said means for retarding change of pressure comprising lever means having one end swingably mounted with respect to said terminals and another end freely contactable on said bridge member whereby to cause said lever means to follow motion of said bridge, retarding means operatively engaging said lever means, and means for adjusting the drag of said retarding means.

ALPHONSE P. GAUVREAU.

References Cited in the file of this patent

UNITED STATES PATENTS

| Number | Name | Date |
|---|---|---|
| 1,360,047 | Stirling | Nov. 23, 1920 |
| 1,926,419 | Apple | Sept. 12, 1933 |

FOREIGN PATENTS

| Number | Country | Date |
|---|---|---|
| 430,452 | Great Britain | June 19, 1935 |